Patented May 8, 1945

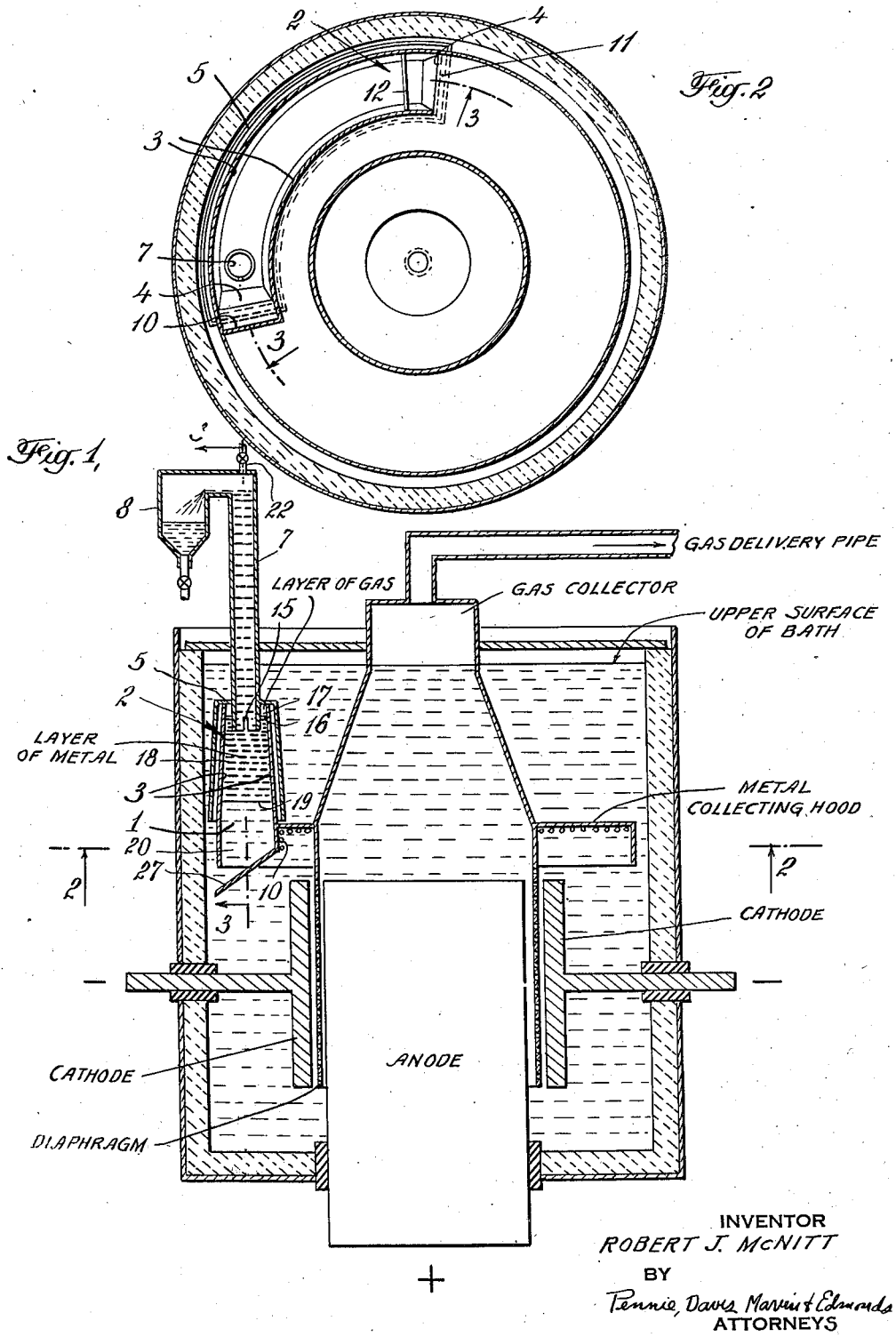

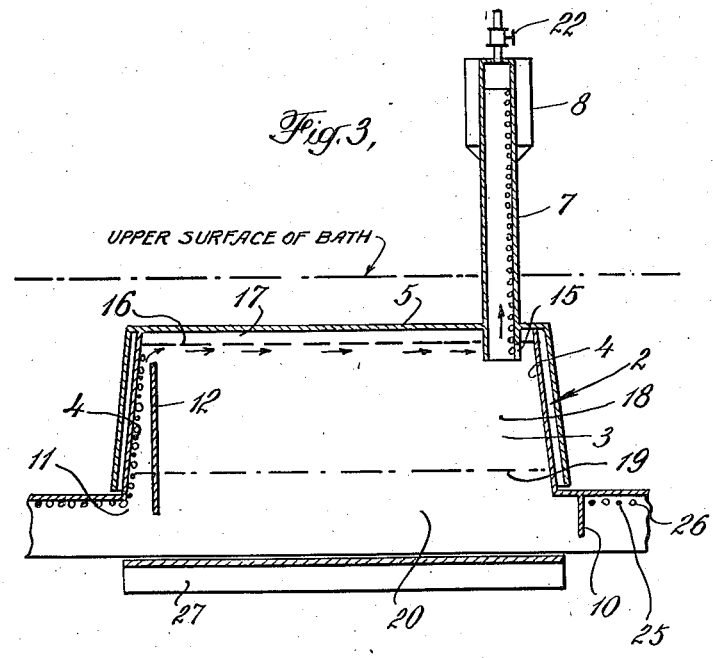
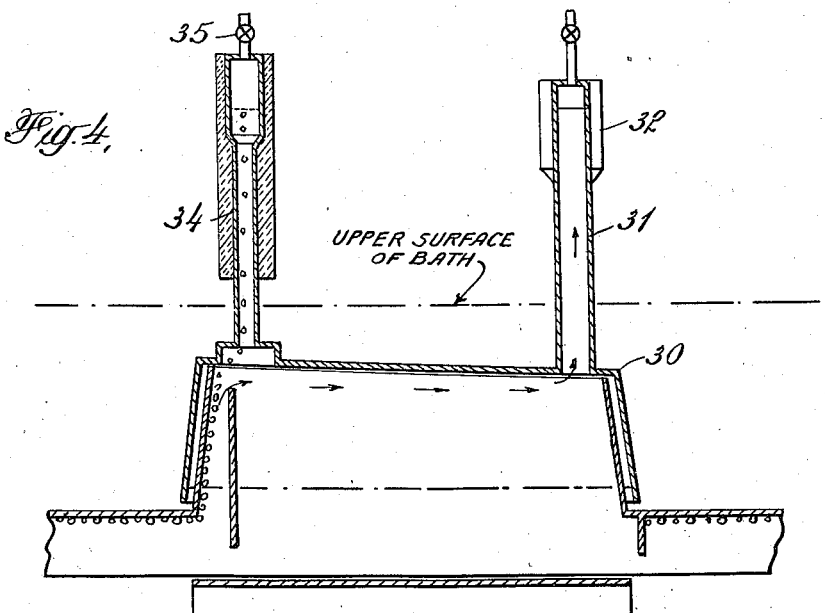

2,375,232

UNITED STATES PATENT OFFICE 2,375,232

RECOVERY OF LIGHT METALS

Robert J. McNitt, Perth Amboy, N. J.

Application October 15, 1941, Serial No. 415,091

10 Claims. (Cl. 204—64)

This invention relates to the recovery of light metals from a fused bath whch is more dense than the metal. It pertains particularly to the recovery of light metals which are produced by chemical or electrochemical action in baths of fused salts and to the recovery of light metals from fused baths in which the metals have been placed for purification.

In the recovery of these light metals from fused baths, it is customary to collect globules of the liquid metal under a hood submerged in the bath. Flowing along the under side of the top or roof of the hood, the metal passes through an opening in said top and enters a delivery duct through which it rises above the upper surface of the bath by reason of its low specific gravity and is discharged therefrom into a receiver.

The crude metal as collected in the bath may contain such impurities as salts from the bath, other compounds of the metal sought, carbon, and other metals and their compounds. Some of these impurities are merely entrapped as particles in the crude metal. Other impurities are dissolved in the metal at the temperature of the fused bath but may be more or less completely thrown out of solution at lower temperatures. Such of these impurities as can be made to settle out of the crude metal by gravity are designated herein as sedimentary impurities. In present operations, these impurities separate out in the delivery duct and form cement-like accretions on the wall of the duct which must be removed by scrapers to prevent the obstruction from completely blocking the upward flow of metal. Even with the frequent use of scrapers and agitators, blockages occur which seriously restrict the flow of metal and make necessary the replacement of the duct. This difficulty causes much expense and results in a considerable loss of metal.

I have found that a great deal of this trouble and expense is due to particles of molten bath which are carried into the delivery duct with the metal and congealing as the temperature of the metal falls after rising above the upper surface of the bath serve to bind other impurities and particles of metal in cement-like accretions on the wall of the duct.

It is the aim of this invention to provide an improved apparatus for and method of removing the metal from the bath and it comprises the preliminary separation of salt and other sedimentary impurities from the crude metal before it becomes chilled in the upper part of the delivery duct.

In accordance with my invention as described in my copending application Serial No. 329,879, filed April 16, 1940, of which this application is a continuation-in-part, I provide a pool of liquid metal below the surface of the bath of the same kind as the metal which it is desired to recover from the bath. I prefer to collect or accumulate a pool of crude metal in a layer of sufficient depth and area and to maintain it in such a quiet state that sedimentary impurities, such as entrapped particles of salt, separate out of the crude metal and fall back into the bath. I have found it advantageous to direct the metal containing sedimentary impurities to one portion of the pool and to remove the metal at a place remote from the place where the metal enters the pool. In this manner the metal flows in a gentle stream through or across the pool to the place where the metal is removed from the pool without objectionably interfering with the settling of the sedimentary impurities.

More or less gas, such as hydrogen, is usually collected under the hood with the metal and I have found that when gas passes from the bath into the metal, it carries particles of salt into the metal. It is an aim of my invention to avoid this contamination by preventing gas from entering the metal from the bath after the metal has been subjected to preliminary purification in the pool of metal. The gas collected with the metal under the hood may be allowed to rise to the top of the delivery duct with the metal or may be discharged through an independent duct. In either case provision is made to avoid agitation of the pool of metal by the passage of the gas.

The apparatus of the invention comprises a metal collecting hood of the type arranged beneath the upper surface of the bath. I provide a pocket for the confinement of a relatively deep pool of metal, preferably beneath the upper surface of the bath, and passage means for flowing the collected metal and gas into the pool. While I prefer that the pool shall be submerged, that is, not extend above the upper surface of the bath, it may, however, extend above the bath when adequate thermal insulation is used to prevent chilling of the upper layer of metal. Chilling of a part of the metal causes convection currents which agitate the metal. I aim to provide such uniform temperature in the pool of metal that convection currents are practically eliminated. I prefer to locate means for removing metal from the pocket at a distance remote from the place where the metal and gas enter the pool, to facilitate sedimentation of impurities. I may so arrange duct means in the top of the pocket that the gas will accumulate in a layer above the metal and I may remove the gas through the same duct that the metal is removed through or I may remove the gas through a separate duct, for example, one located near the place where the metal and gas enter the pocket. In order to aid in the maintenance of a quiet body of metal in the pool and to prevent interference with the settling of the sedimentary impurities, I prefer to provide a baffle beneath the pocket where it opens into the bath to prevent gas bubbles rising in the bath beneath the pocket from passing directly upward into the metal in the pool and agitating the metal and carrying particles of bath into the metal.

I prefer to use a rather narrow and deep pocket and one having sufficient length (the exact proportion depending on the amount of metal recovered per unit time and the amount and kind of impurities to be removed) that the metal entering near one end may flow through the pool in a gentle stream without appreciably interfering with the settling of the sedimentary impurities and flow slowly enough to permit the removal of these impurities.

In the accompanying drawings:

Fig. 1 is a sectional side view of an electrolytic cell embodying the invention;

Fig. 2 is a sectional view from below along the line 2—2 of Fig. 1;

Fig. 3 is the projection of a section taken along the line 3—3 of Fig. 1, and

Fig. 4 is a sectional view, taken at a position similar to Fig. 3, of another form of cell embodying the invention.

The apparatus for the preliminary purification of a light metal illustrated in Figs. 1, 2 and 3 is an electrolytic cell comprising a central anode, a surrounding annular cathode, a diaphragm, and a metal collecting hood suspended in the bath beneath the upper surface of the bath. In accordance with the apparatus of the invention, the top portion of the metal collecting hood has an opening 1 above which is attached a pocket 2 for receiving metal collected under the hood. The pocket comprises arcuate side walls 3 and end walls 4 rising from the opening in the top of the hood and a cover 5 which is slipped over the side and end walls.

Near one end of the top portion of the cover 5 a metal delivery duct 7 is attached, the lower end of which extends beneath the top of the cover an appreciable distance, and the upper end connects to a metal receiver 8. Depending from the top of the hood is a baffle 10 which forms a guide for the horizontal movement of metal and gas collected under the hood into the desired part of the pocket. The metal and gas collected under the hood must flow to the opening 11 at one extreme end of the pocket. I prefer to arrange another baffle 12 near the end where the metal and gas enter the pocket to direct the flow in an upward direction to the top of the pocket. I prefer to locate the metal delivery duct 7 at a place remote from the end where the metal and gas enter the pocket.

I may form a small slit 15 in one side of the duct 7, preferably on the side next to the end wall, through which the gas may enter the duct and escape through the valve 22. The upper end (or top) of this slit establishes the lower level 16 of the layer of gas 17. The pocket is relatively deep and will permit the accumulation and confinement therein of a layer of gas 17 and a deep pool or layer of metal 18, the upper surface of which embraces the lower level 16 of the gas layer 17 and the lower surface 19 embraces the salt bath 20 upon which the pool of metal rests. I prefer to incline the under surface of the top of the hood slightly upward to the entrance 11 of the pocket so that the globules of metal 25 and small bubbles of gas 26 together with their accompanying sedimentary impurities which collect under the hood travel around to the opening 11 where they rise in the space between the end wall and the baffle 12. The gas flows directly upward into the layer 17 and the metal flows in a gentle stream, as shown by the arrows, across the pool of metal and enters the duct 7 where it rises by reason of its low specific gravity and flows upward into the receiver 8. The gas moves around the duct to the slit 15 where it enters in fine bubbles and flows upward through the upper surface of the metal to the valve 22 through which it escapes to the atmosphere. By reason of the depth and area of the metal confined within the pocket, the gentle movement of the metal, its low viscosity due to the high temperature, and the absence of thermal convection currents, since all the metal in the pool is at one temperature being submerged in the path, the conditions are conducive to a very effective settling of the sedimentary impurities from the pool of metal to the salt bath beneath.

There is a certain amount of gas, such as hydrogen, rising in the bath and I prefer to prevent this gas from passing directly upward into the metal in the pool and to this end I arrange a baffle 27 in an angular position beneath the opening to the pocket. I may, as illustrated, attach it to a portion of the baffle 10 and slant it in such manner that gas bubbles are deflected away from the pool of metal and the impurities are deflected toward the cell wall with a better chance of falling into the sump at the bottom of the cell.

The modified form of apparatus illustrated in Fig. 4 is, as clearly shown, similar in many respects to that illustrated in Figs. 1, 2 and 3. The apparatus of Fig. 4, however, has a cover 30, the top of which is inclined slightly from the horizontal, the lowermost portion of which is on the right end where the metal delivery duct 31 is attached. The highest portion of the top of the cover 30 is on the left end and a gas duct 34 is attached thereto for removing gas which enters the pocket and discharging it to the atmosphere through the valve-controlled pipe 35. In this adaptation of the invention there is no appreciable layer of gas formed in the pocket, since it is free to escape through the duct 34 as fast as it enters the pocket.

In starting an operation, I prefer to put molten metal in the pocket 2 but the pocket may be filled by the accumulation of metal after the cell starts. The metal is very fluid at the temperature maintained in the bath and the pocket is of such proportions that practically all of the sedimentary impurities which are held in suspension at the operating temperature are separated from the incoming stream of metal as it flows across the pool of metal.

Through the method of preliminary purification described, most of the difficulty and expense due to obstructions in the delivery ducts 7 and 31 may be avoided.

I claim:

1. The improved method of recovering a light metal from a fused bath more dense than the metal which comprises collecting the metal together with the sedimentary impurities and small amounts of gas which accompanies the metal under a hood beneath the upper surface of the bath, forming a relatively deep pool of metal beneath the upper surface of the bath but above the metal under the hood, regulating the escape of gas and forming a layer of gas above the layer of metal, maintaining the metal in the pool at a substantially uniform temperature throughout to eliminate convection currents and permitting an effective separation of the sedimentary impurities from the metal, and removing the metal and gas from the pool, said metal being removed from the pool continuously as it is produced.

2. The improved method of recovering a light metal from a fused bath more dense than the metal which comprises collecting the metal together with the sedimentary impurities and small amounts of gas which accompanies the metal under a hood beneath the upper surface of the bath, forming a pool of metal having considerable depth and area beneath the upper surface of the bath and entirely above the metal under the hood, directing the flow of metal and gas collected under the hood to an entrance portion of the pool, permitting the gas to rise above the metal in the pool, flowing the metal without appreciable agitation across the pool to a place where the metal is removed from the pool, maintaining the temperature of the metal in the pool substantially uniform throughout to prevent convection currents therein, the metal remaining in the pool for a sufficient time and in a sufficiently quiet state to permit an effective settling of sedimentary impurities from the metal, controlling the removal of gas from the pool to prevent agitation of the metal, and removing purified metal from the pool.

3. The method of subjecting a light metal to a preliminary settling purification in a fused salt bath which comprises collecting a deep body of the metal including sedimentary impurities in a pool beneath the upper surface of the bath, adding metal and the sedimentary impurities to the pool continuously, said pool being surrounded with uniform thermal conditions which prevent convection currents in the metal in the pool, maintaining the major portion of the metal of the pool in a quiet state to cause a settling of the sedimentary impurities and their return to the bath, and removing the purified metal from the pool continuously without agitating the metal in the pool to a point where it will objectionably interfere with the settling of the sedimentary impurities, said metal being removed in an upward moving column of metal which is very much smaller in horizontal cross sectional area than the pool of metal.

4. The improved method of recovering a light metal by electrolysis of a fused salt bath which comprises decomposing the salt in the electrolytic zone between the electrodes, collecting the metal and its accompanying sedimentary impurities under a hood under the bath, forming a relatively deep pool of the metal beneath the upper surface of the bath and above the metal under the hood and maintaining the pool in such a quiet state for such a time that the sedimentary impurities settle out and return to the salt bath, preventing gas rising in the bath from flowing directly upward from the bath into the metal in the pool, passing the gas from the hood to one side-portion of the pool and upward to prevent gas agitation of the metal in the pool, and removing the metal from the pool after the sedimentary impurities have settled out.

5. Apparatus for recovering a light metal from a fused salt bath more dense than the metal which comprises a metal collecting hood arranged to collect metal below the upper surface of the bath, a pocket having walls extending upwardly from the hood and a cover and adapted to confine a deep pool of metal in the form of a layer above the hood but under the bath, said pocket having an opening through which impurities settling out of the metal of the pool may return to the bath, means for guiding the passage of metal collected under the hood into one part of the pocket to prevent agitating the metal therein, and a duct entering the layer of metal in the pocket for removing metal from the pocket due to its buoyancy.

6. Apparatus for recovering a light metal from a fused salt bath more dense than the metal which comprises a metal collecting hood arranged to collect metal and gas below the upper surface of the bath, a pocket having walls extending upward from the hood and a cover and adapted to confine a deep pool of metal in the form of a layer above the hood, means for directing metal and gas collected under the hood upward into the pocket, said pocket having an opening through which impurities settling out of the metal of the pool may return to the bath, baffle means to direct the metal and gas from the hood to the pocket, a duct for removing gas from the pocket located near the place where the metal and gas enter the pocket, and a delivery duct for metal located at a place remote from the place where the gas duct connects to the pocket.

7. The combination with a hood for collecting metal and gas beneath a fused salt bath which comprises a pocket formed of metal having upright sides and a top for the accumulation therein of a pool of metal, said pocket being spaced from the hood and having connecting passage means for passing metal and gas from the hood into a selected part near one side of the pocket, said pocket being submerged in the bath and arranged to collect a pool of metal which extends above the hood, means for maintaining the metal in the pocket at uniform temperature to eliminate convection currents and means to prevent gas agitation to maintain the metal in the pool in a sufficiently quiet state that the sedimentary impurities may settle out of the metal and return to the bath, and duct means for removing purified metal and gas from the pocket by gravity flow.

8. Apparatus according to claim 7 which comprises a metal delivery duct in the pocket which extends into the pocket permitting the gas to form in a layer above the metal.

9. Apparatus according to claim 7 which comprises separate ducts for removing gas and metal from the pocket.

10. Apparatus according to claim 7 which comprises a baffle beneath the pocket which prevents gas passing upward from the bath to enter the metal in the pocket.

ROBERT J. McNITT.